3,238,176
AGE-RESISTANT CROSS-LINKED ETHYLENE
POLYMERS STABILIZED WITH THIOUREAS
Lester A. Brooks, East Norwalk, Homer H. Farmer, Westport, and Robert T. O'Shaughnessy, East Norwalk, Conn., assignors to R. T. Vanderbilt Company, Inc., New York, N.Y., a corporation of New York
No Drawing. Filed Dec. 24, 1962, Ser. No. 246,675
21 Claims. (Cl. 260—45.8)

The present invention pertains to ethylene polymers, and more particularly to age-resistant cross-linked ethylene polymers.

This application is a continuation-in-part of our copending application Serial No. 111,158, filed May 19, 1961, now abandoned.

A number of ethylene polymers have been produced heretofore. In order to improve the properties of these polymers, they have been loaded with various fillers. However, both the loaded and unloaded ethylene polymers have very serious drawbacks. For example, they are thermoplastic materials having a softening point as low as 200° F. and accordingly they can only be used under limited temperature conditions which do not exceed their low softening point.

In order to further improve the properties of loaded and unloaded ethylene polymers, they have previously been cured, i.e., cross-linked or thermoset, by the action of various cross-linking agents. While cross-linked ethylene polymers, either loaded or unloaded, have properties which are superior to those of thermplastic uncross-linked ethylene polymers, nevertheless the cross-linked ethylene polymers have relatively poor age resistance so that their properties deteriorate in time upon exposure to heat and oxygen.

Therefore, the objects of the present invention are to provide cured or cross-linked ethylene polymers which retain excellent physical properties after aging, yet can be cross-linked at a satisfactory rate and to a high degree; and will not be unduly discolored either before or after aging.

It was thought that the problem of poor age resistance of cross-linked ethylene polymers could be overcome, provided an antioxidant was incorporated into the ethylene polymers prior to curing the same. However, it was found that most known antioxidants for rubber and uncross-linked ethylene polymers, such as certain acetone-amine condensation products, bis-phenols, hindered phenols, metal salts of dialkyldithiocarbamic acids, tetraalkylthiuram disulfides, diarylamines and diarylphenylenediamines, appear to react with the peroxide cross-linking agent or in some other way interfere with the action of the cross-linking agent so that the resulting "cured" ethylene polymers had a low rate and/or state of cross-linking. Therefore, these antioxidants were no longer present in sufficient quantity to provide proper protection to the cross-linked ethylene polymers upon aging thereof. Moreover, they highly discolored the unaged cross-linked ethylene polymers. It was discovered quite unexpectedly that the problems of discoloration, poor age resistance, and poor rate and state of cross-linking of cross-linked ethylene polymers could be overcome, provided a tetrasubstituted mono-thiourea compound described below was incorporated into the ethylene polymers as a stabilizing agent prior to curing the same.

The curable ethylene polymer compositions of the invention which can be converted by heating into cured or cross-linked ethylene polymers having excellent age resistance contain three essential components. The first component is a homopolymer, coplymer or terpolymer of ethylene. Suitable well-known ethylene polymers which can be used include those described in U.S. Patents Nos. 2,153,553, 2,200,429 and 2,839,518. Suitable copolymers of ethylene are those having at least about 50 mole percent of ethylene units, such as Enjay EP404 which is a completely saturated ethylene-propylene copolymer containing 85±5 mole percent of ethylene and Enjay EPR which is a completely saturated ethylene-propylene copolymer containing 58±5 mole percent of ethylene. The preferred ethylene polymers are the low, medium and high sensity polyethylenes.

The second component is a heat-activated ethylene polymer cross-linking agent which is also a well-known material. Typical examples of these which can be used include those described in U.S. Patents Nos. 2,455,910, 2,528,523, 2,628,214, 2,826,570, 2,830,978, 2,888,424 and 2,916,481. In general the cross-linking agents are organic peroxides and preferably organic peroxides which decompose at temperatures above the softening point of the polymer and which contain at least one peroxy group in which all of the peroxy oxygens are connected directly to tertiary carbon atoms whose remaining valences are attached to organic radicals, such as alkyl and aryl radicals. Typical examples of such organic peroxides include bis-($\alpha,\alpha$-dimethylbenzyl) peroxide, bis($\alpha,\alpha$-dimethyl-4-chlorobenzyl) peroxide, bis($\alpha,\alpha$-dimethyl-3,4-dichlorobenzyl) peroxide, bis($\alpha,\alpha$-dimethyl-p-isopropylbenzyl) peroxide, bis($\alpha,\alpha$-dimethyl-p-methylbenzyl) peroxide, t-butyl-$\alpha$-cumyl peroxide, di(tertiary-butyl) peroxide, di(tertiary-amyl) peroxide, tertiary-butyl-tertiary-amyl peroxide and 2,7-bis(t-butylperoxy)-2,7-dimethyloctane. The two preferred cross-linking agents are dicumyl peroxide or bis-($\alpha,\alpha$-dimethylbenzyl) peroxide and 2,5-bis(tertiary-butylperoxy)-2,5-dimethylhexane. The curable ethylene polymer compositions contain from about 0.1% to about 10%, and preferably from about 1.5% to about 3%, by weight of the polymer of a heat-activated ethylene polymer cross-linking agent.

The remaining essential component is a stabilizing agent. The stabilizing agent is present in the compositions in an amount from about 0.05% to about 5%, and preferably from about 0.25% to about 1%, by weight of the ethylene polymer. The stabilizing agent is a tetrasubstituted mono-thiourea compound having the structural formula

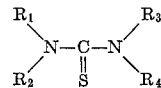

$R_1$ and $R_2$ are alkyl radicals, which can be the same or different radicals, having from 1 to 4 carbon atoms, such as methyl, ethyl, n-propyl, i-propyl, n-butyl, i-butyl and t-butyl. $R_3$ and $R_4$ are aryl, alkaryl or alkoxyaryl radicals, which can be the same or different radicals, all having from 6 to 14 carbon atoms, such as phenyl, naphthyl; tolyl, xylyl, octylphenyl; methoxyphenyl, and propoxyphenyl. $R_3$ plus $R_4$ together with the adjoining nitrogen atom of the thiourea nucleus can be a heterocyclic group, such as morpholino, piperidino, pyrrolidino, phenothiazino and alkylated dihydroquinolino. Typical examples of such stabilizing agents include N-(diethylthiocarbamoyl)-1,2-dihydro-2,2,4-trimethylquinoline, 1,1-diethyl-3,3-diphenyl-2-thiourea, 1,1-diethyl-3-phenyl-3-(p-isopropoxyphenyl)-2-thiourea, N-(diethylthiocarbamoyl)-phenothiazine, 1,1-diethyl-3-($\beta$-naphthyl)-3-phenyl-2-thiourea, 1,1 - diethyl-3,3-bis(4-methoxyphenyl)-2-thiourea, and 1,1-diethyl-3,3-bis(p-octylphenyl)-2-thiourea.

The stabilizing agent can be prepared by reacting together one mole of a dialkylthiocarbamoyl chloride, such as dimethylthiocarbamoyl chloride or diethylthiocarbamoyl chloride or dibutylthiocarbamoyl chloride, with one mole of an aromatic secondary amine, such as diphenyl amine, phenothiazine, or phenylnaphthylamine. A detailed example of the preparation of a typical tetrasubstituted mono-thiourea stabilizing agent is set forth below.

1,1-diethyl-3,3-diphenyl-2-thiourea was prepared in the following manner. In a 1-liter round-bottomed flask there were placed 85 grams (0.5 mole) of diphenylamine, 76 grams (0.5 mole) of diethylthiocarbamoyl chloride, 41 grams (0.52 mole) of pyridine and 500 milliliters of benzene. The benzene served as the solvent reaction medium and the pyridine was present in the mixture to take up the hydrochloric acid by-product formed during the reaction between the diphenylamine and the diethylthiocarbamoyl chloride. This mixture was heated under reflux for seven hours, then water was added and the contents of the flask transferred to a separatory funnel. The benzene layer was washed with water, then separated and dried over anhydrous calcium sulfate. The benzene was removed under reduced pressure and the solid residue was washed with methanol. The yield was 112 grams of a solid having a melting point of 124–127° C. The crude product was purified by recrystallizing from a benzene-hexane mixture. The analysis was as follows:

Calculated for $C_{17}H_{20}N_2S$: C=71.62%; H=7.09%. Found: C=71.82%; H=7.02%.

If desired, the ethylene polymer compositions can be loaded or filled with an amount up to about 400%, and preferably with from about 50% to about 300%, by weight of the ethylene polymer of a filler, for example, carbon black. Suitable carbon black fillers include fine and medium thermal carbon blacks, furnace blacks, channel blacks, acetylene blacks and lamp blacks. Silica, alumina, and silicate, carbonate, and oxide-type fillers can also be used. The preferred filler is carbon black. Other additives which can be used in small amounts, if desired, include lubricants, anti-static agents, dyes, blowing agents, and the like.

The curable ethylene polymer compositions are prepared by blending or mixing the three essential components thereof and any optional components at a temperature above the softening point of the ethylene polymer and below the decomposition temperature of the cross-linking agent. If blending is done at a temperature in excess of the decomposition temperature of the cross-linking agent, premature curing or "scorch" of the ethylene polymer will occur, which is undesirable. The blending temperature will vary with the nature of the ethylene polymer and cross-linking agent employed. In general, however, the blending or mixing is conducted at a temperature from about 212° F. to about 300° F.

The blending may be conducted in suitable blending equipment, for example, two-roll rubber mills or internal mixers, such as Banbury mixers. When using a laboratory size Banbury mixer, good blending of the components can be obtained within from about 5 minutes to about 10 minutes at a rotor speed of from about 75 r.p.m. to about 120 r.p.m. When using higher speeds, shorter blending times within the above range may be used. Larger blenders normally are operated at lower rotor speeds of the order of 20 r.p.m. to 40 r.p.m. for proportionately longer periods. It is preferred to blend the cross-linking agent into the ethylene polymer stock after all of the other components have been blended therein in order to lessen the likelihood of "scorch."

The curable ethylene polymer compositions are converted into compositions of cross-linked ethylene polymers having excellent age resistance by heating the compositions to a temperature above the softening point of the polymer and the decomposition temperature of the cross-linking agent and below the decomposition temperature of the ethylene polymer. The temperature of curing or cross-linking varies with the decomposition or activation temperature of the cross-linking agent employed. In general, however, this temperature for practical peroxide cross-linking agents will lie in a range from about 260° F. to about 500° F. The time of curing also varies with the activity of the cross-linking agent. Usually, however, the time of curing will lie in a range from about ½ minute to about 60 minutes. Naturally the shorter curing times are generally used with the higher curing temperatures. Curing can be done by conventional techniques, such as press and open steam curing. Sources of heat for the curing include steam, induction heating, and heated air, metals and liquids.

The cross-linked ethylene polymer products can be given any desired shape, either prior to curing or simultaneously with curing, utilizing conventional shaping techniques, such as calendering, molding, and extruding.

The antioxidant effect of typical tetrasubstituted monothiourea stabilizing agents of the invention was tested by blending 0.5 part by weight of the stabilizing agent into 100 parts by weight of DYNH–1 low density polyethylene in a Banbury mixer, adding 2 parts by weight (based on active content) of a conventional organic peroxide cross-linking agent, namely 2,5-di-tertiary-butylperoxy-2,5-dimethylhexane, on the mill at a stock temperature of 240° F. to 260° F., then press curing the composition at 340° F. for 40 minutes. For comparison, control stocks were prepared in the same manner, omitting only the stabilizing agent.

The important physical properties of tensile strength (p.s.i.) and percent elongation at break were then measured. The cured stocks were also visually graded for discoloration on a scale from 1 to 10 where 1 represents an opaque-translucent white stock, 10 represents a dark reddish brown highly discolored stock, and the intervening numbers from 2 to 9 represent progressively more discolored stocks between 1 and 10.

These physical properties were again measured after heating samples of the cured polyethylene stocks contained in test tubes placed in an electrically heated aluminum block for seven days at a temperature of 300° F. in accordance with the accelerated heat ageing test ASTM designation D865–54T in order to determine their age resistance. The percent retention of these physical properties after ageing was calculated from the following equations:

$$\frac{\text{Tensile after ageing}}{\text{Tensile before ageing}} \times 100 = \text{percent retention of tensile}$$

$$\frac{\text{Elongation after ageing}}{\text{Elongation before ageing}} \times 100 =$$

percent retention of elongation

In this test, the higher the values for percent retention of tensile strength and elongation after ageing, the better the cured polyethylene stock has been protected against degradation. The aged polyethylene stocks were again rated for heat discoloration.

A test was also run to determine the degree or state of cross-linking or curing of the polyethylene blends. This test was a modified Williams plasticity test which is designed to measure the deformation of a cured polyethylene sample under a constant load of 10 kilograms for 30 minutes at a temperature of 250° F. which is above the softening point of the uncross-linked polyethylene. Tensile slabs were used in the preparation of samples tested in the plastometer in order to eliminate any possibility of curing variables in the comparison of tensile data. Four one-half square inch pieces were died out from a tensile slab and plied up. The sample was enclosed in cellophane to prevent sticking to the plate surface and placed in a Williams plastometer which was maintained at 250° F. in a circulating air oven. The initial height of the sample was noted. Prior to compression it increased in height, apparently due to the memory effect of the polyethylene. The maximum height ($H_m$) and the height of the sample after 30 minutes ($H_{30}$) were noted and the percent compression from the maximum rating was recorded based on the following equation:

$$\text{Percent compression} = \frac{H_m - H_{30}}{H_m} \times 100$$

In this test the lower the percent compression value, the greater the degree or state of cross-linking.

Mooney scorch values (at 270° F., larger rotor, time in minutes to 5° F. rise) were also obtained for each of the treated stocks and their controls in order to determine the rate of cure of the stocks. In this test, the higher the Mooney scorch value, the slower the rate of cure.

The typical tetra-substituted mono-thiourea stabilizing agents of the invention and their controls gave the test results set forth in Table I below.

tially the discoloration of aged cross-linked ethylene polymer.

The test procedure given above was also run using other chemically analogous additives in order to demonstrate the remarkably unexpected properties possessed by the cross-linked ethylene polymer compositions of the invention containing the tetra-substituted mono-thiourea stabilizing agents defined above and illustrated in preceding Table I. This comparative data is set forth in Table II below.

TABLE II

Effect of analogous additives on polyethylene cross-linked by Varox[1]

| Example No. | Additive | Percent Retention | | Williams | Mooney | Color | |
|---|---|---|---|---|---|---|---|
| | | Tensile | Elongation | | | Unaged | Aged |
| I | None-Control | 34 | 5 | 21 | 34 | 0 | 9.5 |
| J | Thiourea | 52 | 50 | 26 | 50 | 5 | 9 |
| K | N-phenylthiourea | 46 | 41 | 29 | 70 | 2 | 8 |
| L | Ethylene thiourea | 49 | 17 | 24 | 38 | 2 | 9 |
| M | Bis(isopropyl)thiourea | 48 | 5 | 33 | 71 | 4 | 9 |
| N | Thiocarbanilide | 48 | 6 | 34 | 75 | 4 | 8 |
| O | 1-t-butyl-1-phenyl-2-thiourea | 23 | 4 | 21 | 39 | 4 | 9 |
| P | 1,3-bis(1-phenylethyl)-2-thiourea | 33 | 3 | 30 | 90 | 4 | 9 |
| Q | 1,3-bis(p-methoxy-phenyl)-2-thiourea | 40 | 12 | 30 | 81 | 5 | 8 |
| R | Thrimethyl thiourea | 44 | 9 | 33 | 41 | 4 | 9 |
| S | 1,1-diethyl-3-butyl-2-thiourea | 42 | 3 | 34 | 58 | 4 | 9 |
| T | 1,1-dimethyl-3-isopropyl-2-thiourea | 41 | 5 | 24 | 45 | 4 | 9 |
| U | Morpholine thiocarbanilide | 36 | 3 | 32 | 69 | 4 | 9 |
| V | Tetramethyl thiourea | 30 | 5 | 21 | 39 | 3 | 9 |
| W | Ethyl N,N-bis(p-octylphenyl) carbamate | 34 | 4 | 20 | 26 | 0 | 10 |
| X | N,N-bis(p-octyl-phenyl) benzamide | 34 | 6 | 18 | 25 | 2 | 10 |
| Y | N,N-bis(p-octyl-phenyl) acetamide | 34 | 6 | 23 | 24 | 1 | 10 |

[1] Varox is 2,5-di-tertiary-butylperoxy-2,5-dimethylhexane, sold by R. T. Vanderbilt Co., Inc.

The comparative data in Table II above establish that the chemically related additives all failed as stabilizing agents in cross-linked ethylene polymer for one or more reasons. The extremely low percent retention of tensile and elongation properties show that all these additives

TABLE I

Effect of tetra-substituted mono-thioureas on polyethylene cross-linked by Varox[1]

| Example No. | Stabilizing Agent | Percent Retention | | Williams | Mooney | Color | |
|---|---|---|---|---|---|---|---|
| | | Tensile | Elongation | | | Ungaged | Aged |
| A | None or Controls (average of six) | 34 | 5 | 21 | 34 | 0 | 9.5 |
| B | N-(diethylthiocarbamoyl)-1,2-dihydro-2,2,4-trimethylquinoline | 75 | 94 | 25 | 36 | 5 | 6 |
| C | N-(diethylthiocarbamoyl)-phenothiazine | 94 | 100 | 22 | 29 | 3 | 6 |
| D | 1,1-diethyl-3,3-diphenyl-2-thiourea | 96 | 96 | 22 | 30 | 2 | 4 |
| E | 1,1-diethyl-3-phenyl-3-(p-isopropoxyphenyl)-2-thiourea | 84 | 91 | 22 | 34 | 1 | 5 |
| F | 1,1-diethyl-3-(β-naphthyl)-3-phenyl-2-2-thiourea | 100 | 102 | 22 | 26 | 2 | 5 |
| G | 1,1-diethyl-3,3-bis(4-methoxyphenyl)-2-thiourea | 113 | 110 | 20 | 35 | 3 | 8 |
| H | 1,1-diethyl-3,3-bis(p-octylphenyl)-2-thiourea | 96 | 96 | 18 | 39 | 2 | 4 |

[1] Varox is 2,5-di-tertiary-butylperoxy-2,5-dimethylhexane, sold by R. T. Vanderbilt Co., Inc.

The tetra-substituted mono-thiourea stabilizing agents of the invention are shown by the data in Table I above to be amazingly effective antioxidants in a typical cross-linked ethylene polymer by the very high percent retention of tensile strength and elongation of the stocks in which they are used. Mooney scorch values compared with the control establish that these stabilizing agents do not interfere with the rate of cure of the resin, and the very low Williams plasticity values establish that these antioxidants have little effect on the ultimate state of cure. Moreover, the discoloration ratings show that the stabilizing agents do not appreciably discolor the unaged cross-linked ethylene polymer and generally inhibit substanfailed to protect the cured ethylene polymer stock against oxidative degradation. The very high Mooney scorch values for many of the additives demonstrate that they greatly slowed down the rate of cure of the ethylene polymer stock. The high discoloration ratings for the aged stock establish that these additives did not prevent heat discoloration.

As noted above the stablizing agents of the invention can be used with ethylene polymers cured with various peroxide cross-linking agents. Thus when dicumyl peroxide was used as the curing agent in the test procedure, favorable stabilization properties were again obtained as shown by the representative data in Table III below.

TABLE III
Effect of tetra-substituted mono-thioureas on polyethylene cross-linked by dicumyl peroxide

| Example No. | Stabilizing Agent | Precent Retention | | Williams | Mooney | Color | |
|---|---|---|---|---|---|---|---|
| | | Tensile | Elongation | | | Unaged | Aged |
| Z | Control or none | Fused | Fused | 12 | 21 | 0 | |
| AA | 1,1-diethyl-3,3-diphenyl-2-thiourea. | 83 | 96 | 21 | 19 | 0 | 3 |

As further pointed out above the stabilizing agents of the invention can be used in organic peroxide cured ethylene polymers having at least about 50 mole percent of ethylene units. This is illustrated by the data presented below in Table IV obtained in accordance with the following procedure.

To a stock of 100 parts by weight of Enjay EP404 (a completely saturated ethylene-propylene copolymer containing 85±5 mole percent ethylene), 50 parts by weight of carbon black, 5 parts by weight of zinc oxide, 0.32 part by weight of sulfur and 3.4 parts by weight (based on active content) of 2,5-di-tertiary-butylperoxy-2,5-dimethylhexane there was added 0.5 part by weight of 1,1-diethyl-3,3-diphenyl-2-thiourea stabilizing agent; the stock milled for 3 to 5 minutes at a temperature slightly over 200° F. and subsequently press cured at 320° F. for 60 minutes. For comparison, a control stock was prepared in the same manner, omitting only the stablizing agent.

Mooney scorch time of uncured stocks and tensile strength and elongation of stocks before and after ageing were determined as previously described with the following results.

TABLE IV
Effect of tetra-substituted mono-thioureas on ethylene-propylene copolymers cross-linked by Varox [1]

| Example No. | Stabilizing Agent | Percent Retention | | Mooney |
|---|---|---|---|---|
| | | Tensile | Elongation | |
| AB | Control or none | Fused | Fused | 14 |
| AC | 1,1-diethyl-3,3-diphenyl-2-thiourea | 27.8 | 118 | 14 |

[1] Varox is 2,5-di-tertiary-butylperoxy-2,5-dimethylhexane, sold by R. T. Vanderbilt Co., Inc.

It will be appreciated that various modifications and changes may be made in the compositions and process of the invention in addition to those mentioned above without departing from the spirit thereof and accordingly the invention is to be limited only within the scope of the appended claims.

What is claimed is:

1. A curable ethylene polymer composition which comprises an ethylene polymer having at least about 50 mole percent of ethylene units, from about 0.1% to about 10% by weight of the polymer of an organic peroxide cross-linking agent, and from about 0.05% to about 5% by weight of the polymer of a stabilizing agent having the structural formula

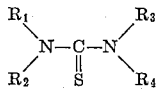

where $R_1$ and $R_2$ are alkyl radicals having from 1 to 4 carbon atoms and $R_3$ and $R_4$ are radicals selected from the group consisting of aryl, alkaryl and alkoxyaryl radicals all having from 6 to 14 carbon atoms and $R_3$ and $R_4$ together with the adjoining nitrogen atom of the thiourea nucleus is a heterocyclic group.

2. A curable ethylene polymer composition as set forth in claim 1 wherein the amount of stabilizing agent is from about 0.25% to about 1% by weight of the polymer.

3. A curable ethylene polymer composition as set forth in claim 1 wherein the amount of cross-linking agent is from about 1.5% to about 3% by weight of the polymer.

4. A curable ethylene polymer composition as set forth in claim 1 wherein the ethylene polymer is polyethylene.

5. A curable ethylene polymer composition as set forth in claim 1 wherein the cross-linking agent is dicumyl peroxide.

6. A curable ethylene polymer composition as set forth in claim 1 wherein the cross-linking agent is 2,5-bis(tertiary-butylperoxy)-2,5-dimethylhexane.

7. A curable ethylene polymer composition which comprises polyethylene, from about 1.5% to about 3% by weight of the polyethylene of dicumyl peroxide, and from about 0.25% to about 1% by weight of the polyethylene of a stabilizing agent having the structural formula

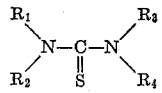

where $R_1$ and $R_2$ are alkyl radicals having from 1 to 4 carbon atoms and $R_3$ and $R_4$ are radicals selected from the group consisting of aryl, alkaryl and alkoxyaryl radicals all having from 6 to 14 carbon atoms and $R_3$ and $R_4$ together with the adjoining nitrogen atom of the thiourea nucleus is a heterocyclic group.

8. A curable ethylene polymer composition which comprises polyethylene, from about 1.5% to about 3% by weight of the polyethylene of 2,5-bis(tertiary-butylperoxy)-2,5-dimethylhexane, and from about 0.25% to about 1% by weight of the polyethylene of a stabilizing agent having the structural formula

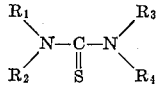

where $R_1$ and $R_2$ are alkyl radicals having from 1 to 4 carbon atoms and $R_3$ and $R_4$ are radicals selected from the group consisting of aryl, alkaryl and alkoxyaryl radicals all having from 6 to 14 carbon atoms and $R_3$ and $R_4$ together with the adjoining nitrogen atom of the thiourea nucleus is a heterocyclic group.

9. A curable ethylene polymer composition as set forth in claim 8 wherein the stabilizing agent is N-(diethylthiocarbamoyl)-1,2-dihydro-2,2,4-trimethylquinoline.

10. A curable ethylene polymer composition as set forth in claim 8 wherein the stabilizing agent is 1,1-diethyl-3,3-diphenyl-2-thiourea.

11. A curable ethylene polymer composition as set forth in claim 8 wherein the stabilizing agent is 1,1-diethyl-3-phenyl-3-(p-isopropoxyphenyl)-2-thiourea.

12. A curable ethylene polymer composition as set forth in claim 8 wherein the stabilizing agent is N-(diethylthiocarbamoyl)-phenothiazine.

13. A curable ethylene polymer composition as set forth in claim 8 wherein the stabilizing agent is 1,1-diethyl-3-(β-naphthyl)-3-phenyl-2-thiourea.

14. A curable ethylene polymer composition as set forth in claim 8 wherein the stabilizing agent is 1,1-diethyl-3,3-bis(4-methoxyphenyl)-2-thiourea.

15. A curable ethylene polymer composition as set forth in claim 8 wherein the stabilizing agent is 1,1-diethyl-3,3-bis(p-octylphenyl)-2-thiourea.

16. The process of producing an age-resistant cross-linked ethylene polymer which comprises forming a mixture containing an ethylene polymer having at least about 50 mole percent of ethylene units, from about 0.1% to about 10% by weight of the polymer of an organic peroxide cross-linking agent, and from about 0.05% to about 5% by weight of the polymer of a stabilizing agent having the structural formula

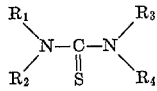

where $R_1$ and $R_2$ are alkyl radicals having from 1 to 4 carbon atoms and $R_3$ and $R_4$ are radicals selected from the group consisting of aryl, alkaryl and alkoxyaryl radicals all having from 6 to 14 carbon atoms and $R_3$ and $R_4$ together with the adjoining nitrogen atom of the thiourea nucleus is a heterocyclic group; and heating the mixture to a temperature above the decomposition temperature of the cross-linking agent and below the decomposition temperature of the ethylene polymer.

17. The process of producing an age-resistant cross-linked ethylene polymer which comprises forming a mixture containing polyethylene, from about 1.5% to about 3% by weight of the polyethylene of dicumyl peroxide, and from about 0.25% to about 1% by weight of the polyethylene of a stabilizing agent having the structural formula

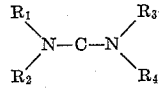

where $R_1$ and $R_2$ are alkyl radicals having from 1 to 4 carbon atoms and $R_3$ and $R_4$ are radicals selected from the group consisting of aryl, alkaryl and alkoxylaryl radicals all having from 6 to 14 carbon atoms and $R_3$ and $R_4$ together with the adjoining nitrogen atom of the thiourea nucleus is a heterocyclic group and heating the mixture to a temperature above the decomposition temperature of dicumyl peroxide and below the decomposition temperature of the polyethylene.

18. The process of producing an age-resistant cross-linked ethylene polymer which comprises forming a mixture containing polyethylene, from about 1.5% to about 3% by weight of the polyethylene of 2,5-bis(tertiary-butylperoxy)-2,5-dimethylhexane, and from about 0.25% to about 1% by weight of the polyethylene of a stabilizing agent having the structural formula

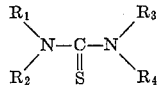

where $R_1$ and $R_2$ are alkyl radicals having from 1 to 4 carbon atoms and $R_3$ and $R_4$ are radicals selected from the group consisting of aryl, alkaryl and alkoxyaryl radicals all having from 6 to 14 carbon atoms and $R_3$ and $R_4$ together with the adjoining nitrogen atom of the thiourea nucleus is a heterocyclic group; and heating the mixture to a temperature above the decomposition temperature of 2,5-bis-(tertiary-butylperoxy)-2,5-dimethylhexane and below the decomposition temperature of the polyethylene.

19. An age-resistant cross-linked ethylene polymer produced by the process of claim 16.

20. An age-resistant cross-linked ethylene polymer produced by the process of claim 17.

21. An age-resistant cross-linked ethylene polymer produced by the process of claim 18.

References Cited by the Examiner
UNITED STATES PATENTS

| | | | |
|---|---|---|---|
| 2,583,370 | 1/1952 | Coppel et al. | 260—45.9 |
| 2,888,424 | 5/1959 | Preropio et al. | 260—37 |

FOREIGN PATENTS

| | | |
|---|---|---|
| 520,923 | 1/1956 | Canada. |
| 871,284 | 6/1961 | Great Britain. |

LEON J. BERCOVITZ, *Primary Examiner.*